US012700288B2

(12) United States Patent
Sumpter et al.

(10) Patent No.: US 12,700,288 B2
(45) Date of Patent: *Aug. 4, 2026

(54) MONITORING AND PREDICTING PHYSICAL FORCE ATTACKS ON TRANSACTION TERMINALS

(71) Applicant: NCR Atleos Corporation, Atlanta, GA (US)

(72) Inventors: Jodessiah Sumpter, Alpharetta, GA (US); Christopher John Costello, Suwanee, GA (US); Matthew Robert Burris, Lawrenceville, GA (US); Gregory Joseph Hartl, Atlanta, GA (US); Caleb Wayne Martinez, Fayetteville, GA (US)

(73) Assignee: NCR Atleos Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/024,850

(22) Filed: Jan. 16, 2025

(65) Prior Publication Data

US 2025/0166469 A1 May 22, 2025

Related U.S. Application Data

(60) Division of application No. 18/545,727, filed on Dec. 19, 2023, now Pat. No. 12,387,572, which is a
(Continued)

(51) Int. Cl.
*G07F 19/00* (2006.01)
*G06Q 20/10* (2012.01)
(Continued)

(52) U.S. Cl.
CPC ....... *G07F 19/207* (2013.01); *G06Q 20/1085* (2013.01); *G06V 10/75* (2022.01); *G06V 20/44* (2022.01); *G06V 20/625* (2022.01)

(58) Field of Classification Search
CPC ... G07F 19/207; G06V 20/52; G06V 2201/05
(Continued)

(56) References Cited

U.S. PATENT DOCUMENTS

| | | | |
|---|---|---|---|
| 11,881,089 B2 * | 1/2024 | Sumpter | G06V 20/44 |
| 12,111,855 B1 * | 10/2024 | Dixit | G06F 16/285 |
| 2023/0088486 A1 * | 3/2023 | Ravindran | G07F 19/207 726/27 |

* cited by examiner

*Primary Examiner* — Suezu Ellis
(74) *Attorney, Agent, or Firm* — Schwegman Lundberg & Woessner, P.A.

(57) ABSTRACT

Factors associated with past brute force attacks on terminals within a given area are derived. The factors include a total number of the past brute force attacks, a severity, a time of day, a calendar date, a day of week, and weather experienced in the given area for each past brute force attack. Visual features are extracted from past video captured of the past brute force attacks. The visual features are associated with individuals, vehicles, orientations of vehicles relative to corresponding terminals, and objects held by or in proximity to the individuals. A machine learning model is trained to predict in real time a future brute force attack when provided the factors and the visual features as input. Current factors and visual features are provided as input for a given terminal, and a real-time alert is sent when a confidence value returned by the model indicates an in-progress attack.

20 Claims, 3 Drawing Sheets

Related U.S. Application Data continuation of application No. 17/732,889, filed on Apr. 29, 2022, now Pat. No. 11,881,089, which is a continuation-in-part of application No. 17/665,021, filed on Feb. 4, 2022, now Pat. No. 11,676,460.

(51) Int. Cl.
*G06V 10/75* (2022.01)
*G06V 20/40* (2022.01)
*G06V 20/62* (2022.01)

(58) Field of Classification Search
USPC .............................. 235/379; 705/43; 348/150
See application file for complete search history.

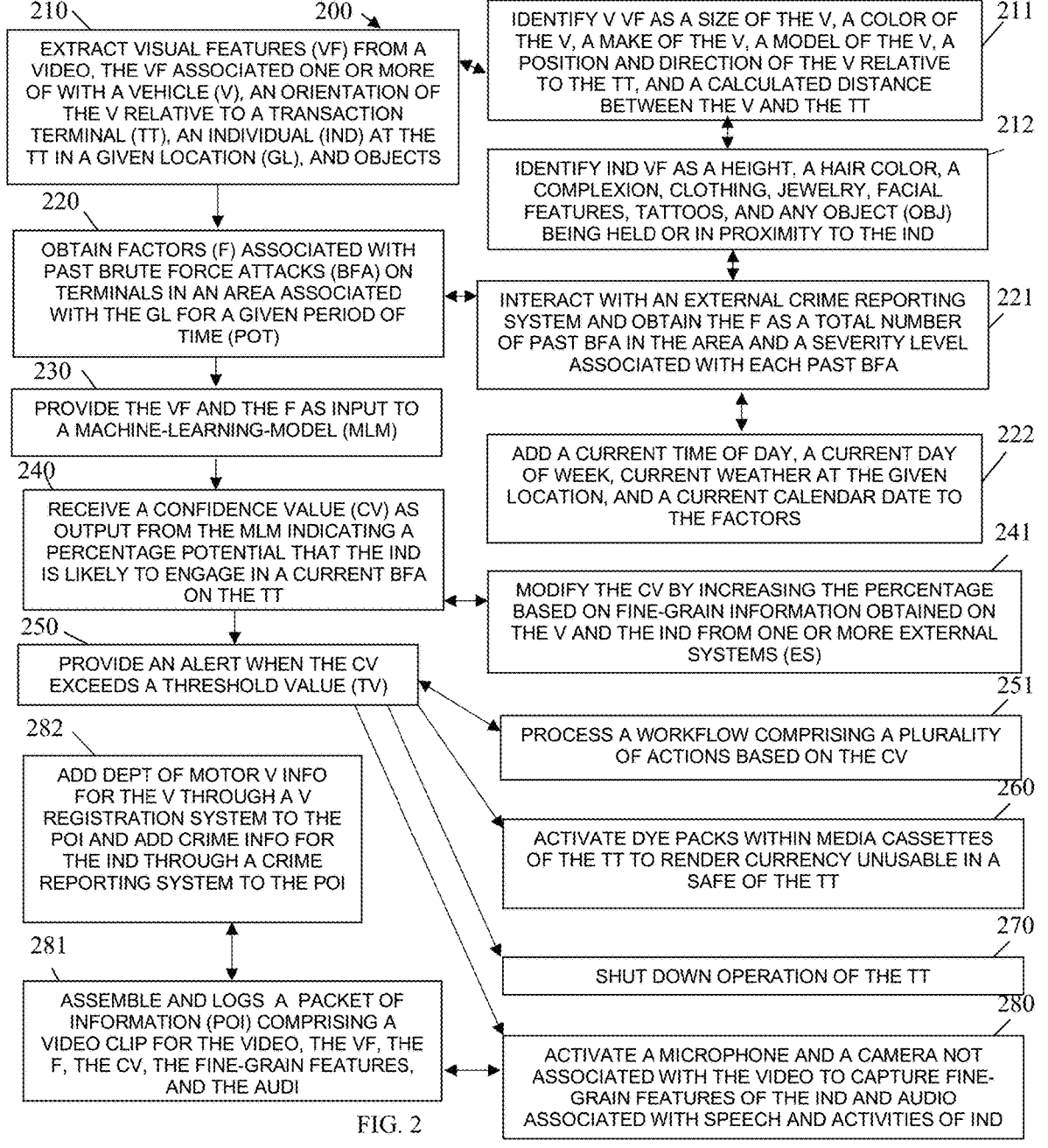

210

200

EXTRACT VISUAL FEATURES (VF) FROM A VIDEO, THE VF ASSOCIATED ONE OR MORE OF WITH A VEHICLE (V), AN ORIENTATION OF THE V RELATIVE TO A TRANSACTION TERMINAL (TT), AN INDIVIDUAL (IND) AT THE TT IN A GIVEN LOCATION (GL), AND OBJECTS

220

OBTAIN FACTORS (F) ASSOCIATED WITH PAST BRUTE FORCE ATTACKS (BFA) ON TERMINALS IN AN AREA ASSOCIATED WITH THE GL FOR A GIVEN PERIOD OF TIME (POT)

230

PROVIDE THE VF AND THE F AS INPUT TO A MACHINE-LEARNING-MODEL (MLM)

240

RECEIVE A CONFIDENCE VALUE (CV) AS OUTPUT FROM THE MLM INDICATING A PERCENTAGE POTENTIAL THAT THE IND IS LIKELY TO ENGAGE IN A CURRENT BFA ON THE TT

250

PROVIDE AN ALERT WHEN THE CV EXCEEDS A THRESHOLD VALUE (TV)

282

ADD DEPT OF MOTOR V INFO FOR THE V THROUGH A V REGISTRATION SYSTEM TO THE POI AND ADD CRIME INFO FOR THE IND THROUGH A CRIME REPORTING SYSTEM TO THE POI

281

ASSEMBLE AND LOGS A PACKET OF INFORMATION (POI) COMPRISING A VIDEO CLIP FOR THE VIDEO, THE VF, THE F, THE CV, THE FINE-GRAIN FEATURES, AND THE AUDI

211

IDENTIFY V VF AS A SIZE OF THE V, A COLOR OF THE V, A MAKE OF THE V, A MODEL OF THE V, A POSITION AND DIRECTION OF THE V RELATIVE TO THE TT, AND A CALCULATED DISTANCE BETWEEN THE V AND THE TT

212

IDENTIFY IND VF AS A HEIGHT, A HAIR COLOR, A COMPLEXION, CLOTHING, JEWELRY, FACIAL FEATURES, TATTOOS, AND ANY OBJECT (OBJ) BEING HELD OR IN PROXIMITY TO THE IND

221

INTERACT WITH AN EXTERNAL CRIME REPORTING SYSTEM AND OBTAIN THE F AS A TOTAL NUMBER OF PAST BFA IN THE AREA AND A SEVERITY LEVEL ASSOCIATED WITH EACH PAST BFA

222

ADD A CURRENT TIME OF DAY, A CURRENT DAY OF WEEK, CURRENT WEATHER AT THE GIVEN LOCATION, AND A CURRENT CALENDAR DATE TO THE FACTORS

241

MODIFY THE CV BY INCREASING THE PERCENTAGE BASED ON FINE-GRAIN INFORMATION OBTAINED ON THE V AND THE IND FROM ONE OR MORE EXTERNAL SYSTEMS (ES)

251

PROCESS A WORKFLOW COMPRISING A PLURALITY OF ACTIONS BASED ON THE CV

260

ACTIVATE DYE PACKS WITHIN MEDIA CASSETTES OF THE TT TO RENDER CURRENCY UNUSABLE IN A SAFE OF THE TT

270

SHUT DOWN OPERATION OF THE TT

280

ACTIVATE A MICROPHONE AND A CAMERA NOT ASSOCIATED WITH THE VIDEO TO CAPTURE FINE-GRAIN FEATURES OF THE IND AND AUDIO ASSOCIATED WITH SPEECH AND ACTIVITIES OF IND

FIG. 2

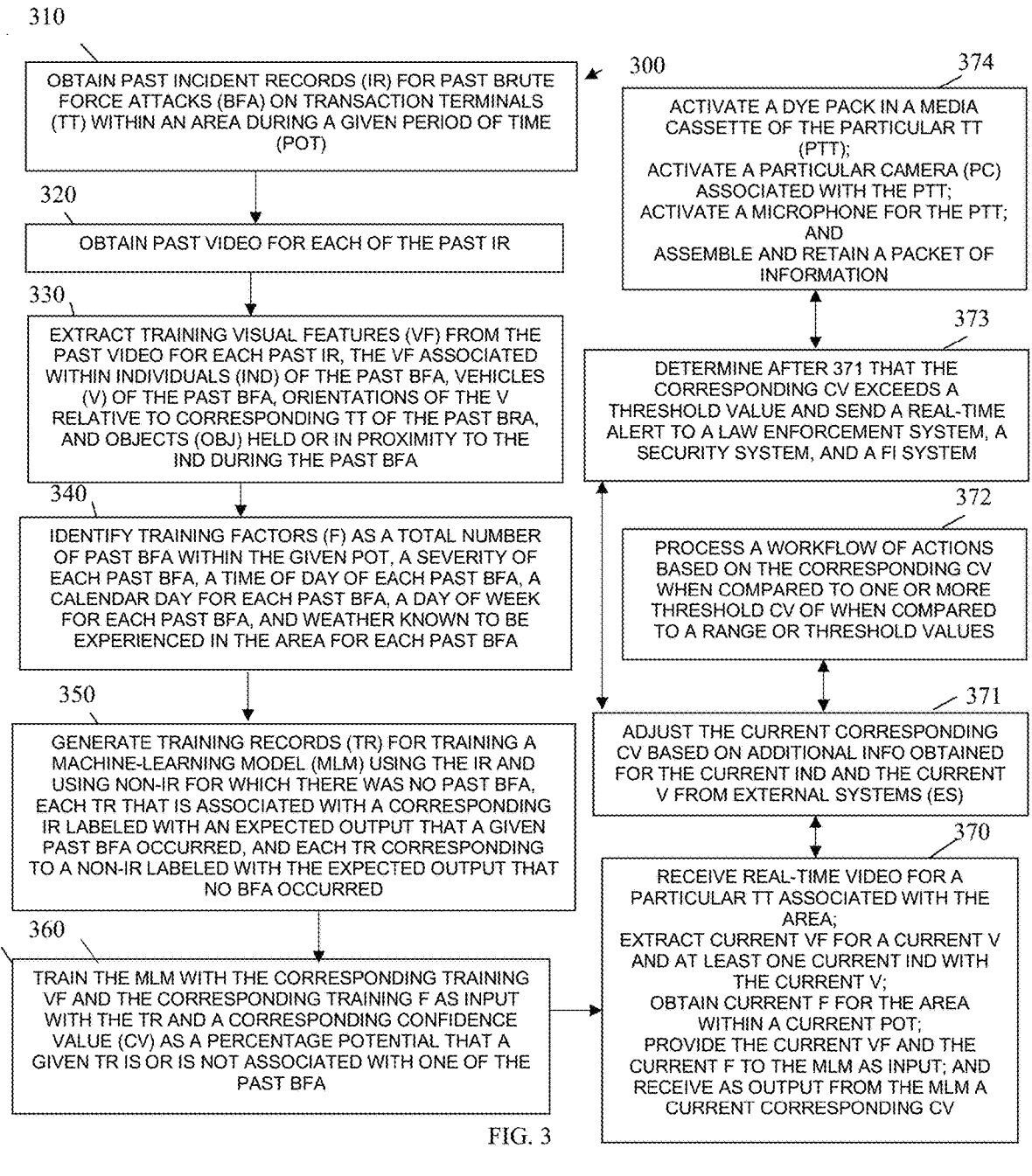

310

OBTAIN PAST INCIDENT RECORDS (IR) FOR PAST BRUTE FORCE ATTACKS (BFA) ON TRANSACTION TERMINALS (TT) WITHIN AN AREA DURING A GIVEN PERIOD OF TIME (POT)

320

OBTAIN PAST VIDEO FOR EACH OF THE PAST IR

330

EXTRACT TRAINING VISUAL FEATURES (VF) FROM THE PAST VIDEO FOR EACH PAST IR, THE VF ASSOCIATED WITHIN INDIVIDUALS (IND) OF THE PAST BFA, VEHICLES (V) OF THE PAST BFA, ORIENTATIONS OF THE V RELATIVE TO CORRESPONDING TT OF THE PAST BRA, AND OBJECTS (OBJ) HELD OR IN PROXIMITY TO THE IND DURING THE PAST BFA

340

IDENTIFY TRAINING FACTORS (F) AS A TOTAL NUMBER OF PAST BFA WITHIN THE GIVEN POT, A SEVERITY OF EACH PAST BFA, A TIME OF DAY OF EACH PAST BFA, A CALENDAR DAY FOR EACH PAST BFA, A DAY OF WEEK FOR EACH PAST BFA, AND WEATHER KNOWN TO BE EXPERIENCED IN THE AREA FOR EACH PAST BFA

350

GENERATE TRAINING RECORDS (TR) FOR TRAINING A MACHINE-LEARNING MODEL (MLM) USING THE IR AND USING NON-IR FOR WHICH THERE WAS NO PAST BFA, EACH TR THAT IS ASSOCIATED WITH A CORRESPONDING IR LABELED WITH AN EXPECTED OUTPUT THAT A GIVEN PAST BFA OCCURRED, AND EACH TR CORRESPONDING TO A NON-IR LABELED WITH THE EXPECTED OUTPUT THAT NO BFA OCCURRED

360

TRAIN THE MLM WITH THE CORRESPONDING TRAINING VF AND THE CORRESPONDING TRAINING F AS INPUT WITH THE TR AND A CORRESPONDING CONFIDENCE VALUE (CV) AS A PERCENTAGE POTENTIAL THAT A GIVEN TR IS OR IS NOT ASSOCIATED WITH ONE OF THE PAST BFA

300

374

ACTIVATE A DYE PACK IN A MEDIA CASSETTE OF THE PARTICULAR TT (PTT);
ACTIVATE A PARTICULAR CAMERA (PC) ASSOCIATED WITH THE PTT;
ACTIVATE A MICROPHONE FOR THE PTT; AND
ASSEMBLE AND RETAIN A PACKET OF INFORMATION

373

DETERMINE AFTER 371 THAT THE CORRESPONDING CV EXCEEDS A THRESHOLD VALUE AND SEND A REAL-TIME ALERT TO A LAW ENFORCEMENT SYSTEM, A SECURITY SYSTEM, AND A FI SYSTEM

372

PROCESS A WORKFLOW OF ACTIONS BASED ON THE CORRESPONDING CV WHEN COMPARED TO ONE OR MORE THRESHOLD CV OF WHEN COMPARED TO A RANGE OR THRESHOLD VALUES

371

ADJUST THE CURRENT CORRESPONDING CV BASED ON ADDITIONAL INFO OBTAINED FOR THE CURRENT IND AND THE CURRENT V FROM EXTERNAL SYSTEMS (ES)

370

RECEIVE REAL-TIME VIDEO FOR A PARTICULAR TT ASSOCIATED WITH THE AREA;
EXTRACT CURRENT VF FOR A CURRENT V AND AT LEAST ONE CURRENT IND WITH THE CURRENT V;
OBTAIN CURRENT F FOR THE AREA WITHIN A CURRENT POT;
PROVIDE THE CURRENT VF AND THE CURRENT F TO THE MLM AS INPUT; AND
RECEIVE AS OUTPUT FROM THE MLM A CURRENT CORRESPONDING CV

FIG. 3

MONITORING AND PREDICTING PHYSICAL FORCE ATTACKS ON TRANSACTION TERMINALS

RELATED APPLICATIONS

The present application is a division of application Ser. No. 18/545,727, entitled "Monitoring and Predicting Physical Force Attacks on Transaction Terminals", filed on Dec. 19, 2023, which is a continuation of application Ser. No. 17/732,889, entitled "Monitoring and Predicting Physical Force Attacks on Transaction Terminals", filed on Apr. 29, 2022, which is a continuation-in part (CIP) of application Ser. No. 17/665,021 entitled "Currency Trapping Detection," filed Feb. 4, 2022, the disclosures of which are incorporated by reference herein in their entirety.

BACKGROUND

Transaction Terminal fraud comes in a variety of techniques used by thieves. Malicious software can be installed on the terminals that permit thieves to monitor and/or control operation of the terminals and/or the peripherals of the terminals. Small malicious hardware devices can be inserted into slots of peripherals to affect the operation of shutters on the peripherals and/or to record and transmit a customer's private payment/bank card data.

Brute physical force is another technique by which thieves steal currency from media depositories of the terminals. Unfortunately, physical force is a growing trend with thieves as they become more emboldened and impatient with other techniques that require technical skill and patience. A popular brute force attack entails attaching a chain on one end to an axel of a truck while the other end of the chain is wrapped around an outer housing of an Automated Teller Machine (ATM—one type of transaction terminal), the thief then drives off with the ATM in tow. This type of attack is referred to as a "hook and chain" attack. Hook and chain attacks do substantial infrastructure damage to the ATMs and if the thieves get away with the ATMs, it is a complete loss in terms of the currency that was stored in the ATMs' media cassettes/safe. Physical force attacks are centered on dismantling the ATM to obtain the currency in the safe.

Physical force attacks are only identified after the ATM has been actively damaged or stolen from its original site (after the fact). Existing video or witnesses may subsequently assist in capturing the thieves but by this point the ATM is usually a complete loss and most of the currency has been spent or cannot be accounted for.

SUMMARY

In various embodiments, a system and methods for monitoring and predicting physical force attacks on transaction terminals are presented.

According to an aspect, a method for monitoring and predicting physical force attacks on transaction terminals is provided. Visual features are extracted from a video, wherein the visual features are associated with a vehicle, an orientation of the vehicle relative to a transaction terminal, and an individual at the transaction terminal in a given location. Factors associated with past brute force attacks on terminals in an area associated with the given location for a given period of time are obtained. The visual features and the factors are provided as input to a Machine-Learning Model (MLM). A confidence value is received as output from the MLM indicating a percentage potential that the individual is likely to engage in a current brute force attack on the transaction terminal. An alert is provided when the confidence value exceeds a threshold value.

BRIEF DESCRIPTION OF THE DRAWINGS

FIG. 2 is a diagram of a method for monitoring and predicting physical force attacks on transaction terminals, according to an example embodiment.

FIG. 3 is a diagram of another method for monitoring and predicting physical force attacks on transaction terminals, according to an example embodiment.

DETAILED DESCRIPTION

Figure 1:
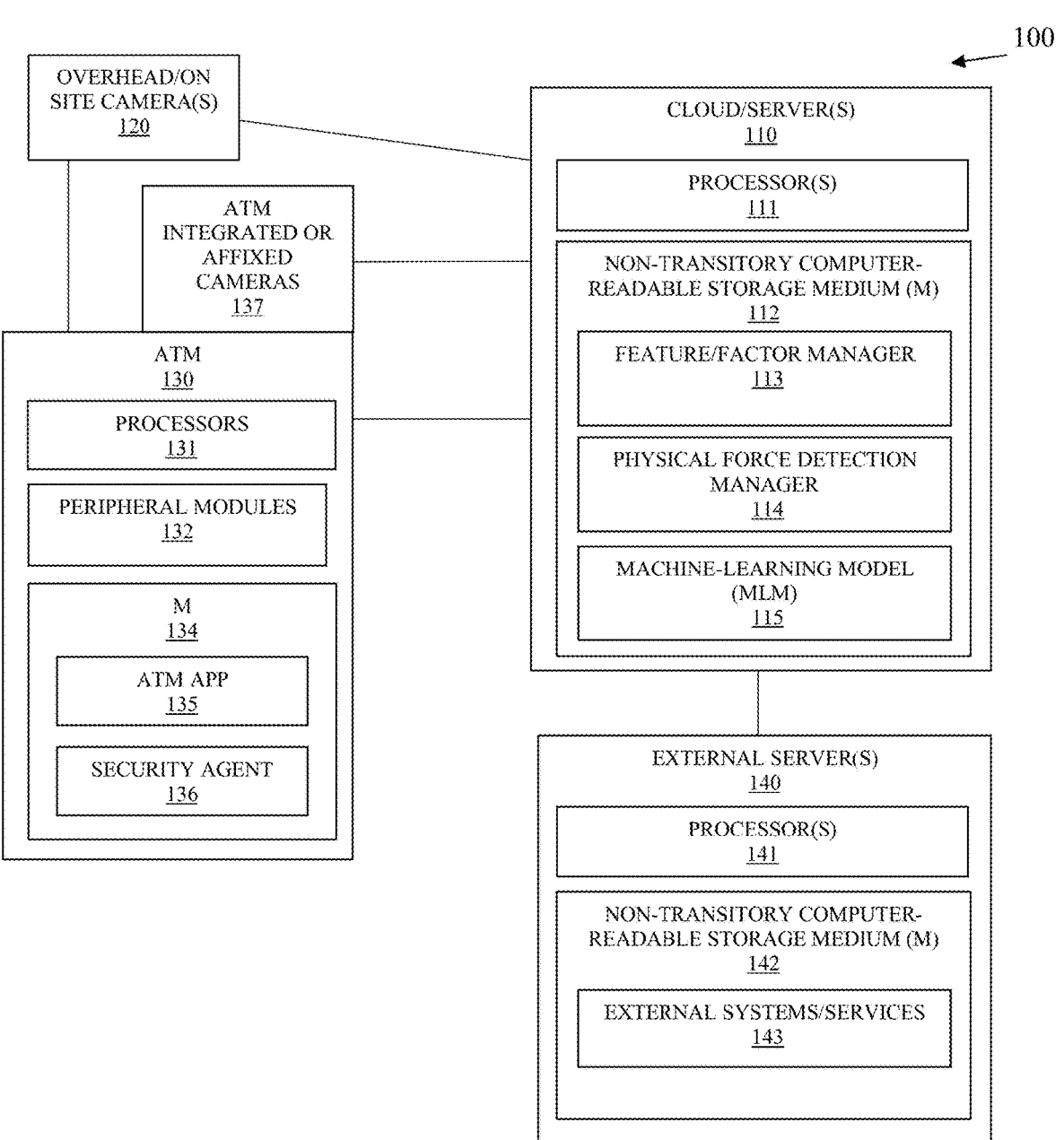
FIG. 1 is a diagram of a system for hand action tracking for monitoring and predicting physical force attacks on transaction terminals, according to an example embodiment.

FIG. 1 is a diagram of a system 100 for monitoring and predicting physical force attacks on transaction terminals, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of monitoring and predicting physical force attacks on transaction terminals, presented herein and below.

As used herein and below the terms "cash" and "currency" may be used synonymously and interchangeably. This can be any government-backed note.

As will be demonstrated herein and below, system 100 and the methods that follow permit a low cost and accurate approach to detecting a brute force ATM attack and predicting when a brute force attack is potentially going to occur (before the attack is actually made by a thief). Computer vision techniques are processed on video captured for an area associated with the ATM and Machine-Learning Models (MLMs) are processed on on factors/features identified with the computer vision to predict whether a brute force attack is potentially going to take place on the ATM. The factors/features of the computer vision technique may include determining a vehicle size, a vehicle type, and current positioning or orientation of a vehicle relative to the ATM.

History associated with the ATM or the area (location) of the ATM is also obtained as a factor/feature from incident logs associated with the ATM or other ATMs within a configured distance of the ATM. The incident logs indicated whether or not and when a brute force attack (such as a hook and chain attack) took place at the ATM or in the vicinity of the ATM in the past. Past video associated with past hook and chain events is also acquired using the incident logs. The computer vision is processed on the past video to obtain training input factors/features derived from the past video. A MLM is then trained on the training factors/features as input with the known hook and chain events labeled during training as expected output from the factors/features. This causes the MLM to configure itself when provided the factors/features in any new current situation to produce as output a confidence value (prediction) as to whether the new current situation is potentially a hook and chain event that is about to occur (but has not yet actually occurred).

Any confidence value produced by a trained MLM that is above a threshold triggers a variety of additional processing by system 100, such as, and by way of example only, enhanced video analysis for facial images or individual-specific attributes (hair length, complexion, clothing, mannerisms, voice, etc.), enhanced video analysis for object detection (license plate numbers, vehicle attributes, chains, tools, etc.), sending alerts or notifications to a variety of systems in real time (Financial Institution (FI) systems, security systems, local law enforcement systems, etc.), sending license plate numbers to a local department of motor vehicles to obtain registrations and violation histories of the individuals that registered the vehicles, shutting down the ATMs, activating currency/media dye packs within media cassettes of the ATMs to render the currency within the ATMs unusable, comparing images of a current event against past images available with historical crimes in the area of the ATMs, and/or generating a report comprising any combination of, or all of the above for analysis. Analysis can be further used for modifying the MLM in subsequent training sessions on new or different factors/features so that the MLM is continuously improving on its accuracy of hook and chain predictions for the ATMs.

It is within this initial context that embodiments are now discussed with reference to the FIGS.

System 100 includes a cloud/server 110 (optional), zero or more overhead/on site cameras 120, an ATM 130, one or more ATM integrated or affixed cameras 137, and one or more external servers 140.

Cloud/Server 110 comprises a processor 111 and a non-transitory computer-readable storage medium 112. Medium 112 comprises executable instructions for a visual feature/factor manager 113, a physical force detection manager 114, and a Machine-Learning Model (MLM) 115. The executable instructions when provided or obtained by the processor 111 from medium 112 cause the processor 111 to perform operations discussed herein with respect to 113-115.

Overhead/On site cameras 120 stream image frames captured from above ATM 130, across a street, or in a vicinity (proximity) of an area surrounding the ATM 130. Overhead/On site cameras 120 are not attached or affixed to ATM 130. Overhead/On site cameras 120 stream the images for the image frames directly to a storage location on ATM 130 and/or cloud/server 110.

ATM 130 comprises, a at least one processor 131, peripheral modules 132 (depository, safe, cash dispenser/acceptor, recycler, touchscreen, key pad, receipt printer, media infeed, etc.) and a non-transitory computer-readable storage medium 134. Medium 134 comprises executable instructions for an ATM application (app) 135 and a security agent 136 (optional). The executable instructions when provided or obtained by the processor 131 from medium 134 cause the processor 131 to perform operations discussed herein with respect to 135 and 136.

ATM integrated or affixed cameras 137 stream image frames captured from adjacent to and focused on any one of the peripheral modules 132 from one or more exterior side surfaces of the ATM 130 focused on any given peripheral module 132. ATM integrated or affixed cameras 137 stream the images for the image frames directly to a storage location on ATM 130 and/or cloud/server 110.

It is noted that cameras 120 and/or 137 may be existing cameras 120 and/or 137 situated overhead/on site of the ATM 120 for security purposes and/or integrated as a peripheral device of the ATM 120. Thus, in some embodiments no additional or new cameras are needed beyond what is already present at the ATM 120 for security monitoring.

In some instances, existing cameras 120 and/or 137 can be refocused or reangled from their existing locations for purposes of some of the embodiments that follow.

It is noted in other embodiments, additional new cameras 120 and/or 137 are deployed and positioned (located and focused) for the purposes of some embodiments that follow.

In some embodiments, cameras 120 and/or 137 may be a combination of existing and new cameras 120 and/or 137.

Each external server 140 comprises at least one processor and a non-transitory computer-readable storage medium 142. Medium 142 comprises executable instructions for an external system/service 143. The executable instructions when provided or obtained by the processor 141 from medium 142 cause the processor 141 to perform operations discussed herein with respect to 143.

Initially, historical video and historical data for a given location associated with a given ATM 130 is acquired. The historical records comprise incident records for which it was determined that a given ATM 130 was subjected to a brute force attack. The historical video is provided to the feature/factor manager 113, and the feature/factor manager analyzes the image frames of the historical video for each incident and obtains visual features relevant to a vehicle make and model involved, the orientation and positioning of the vehicle relative to the ATM 130, attributes of the vehicle such as color, size, shape, etc. Feature/Factor manager 113 also obtains visual features of any individuals detected in the historical video, such as size, gender, weight or build, approximate age, complexion, etc. Moreover, Feature/factor manager 113 obtains attributes of the individuals, such as clothing type, color of clothing, jewelry worn, any noticeable tattoos, etc. Feature/Factor manager 113 obtains the time of day of each given incident, day of week, weather conditions (from a web-based weather service using a zip code for the location, the date, and the time), etc. Feature/Factor manager 113 also identifies objects present in the past video, such as chains, tools, hooks, explosive devices, guns, etc. as other visual features beyond just vehicle visual features and individual visual features. The visual features, attributes, time of day, day of week, weather conditions, location information (such as zip code) are provided a features/factors to train the MLM 115 to physical force detection manager 114.

Physical force detection manager generates uses the incident records and the corresponding feature/factors as training records during a training session with the MLM 115. Each training record comprises input to the MLM 115 that comprises the feature/factors derived by the feature/factor manager along with the time of day, day of week, calendar date, weather conditions, and location information. The training input also comprises an identifier for the ATM 130 hat was subject to the brute force attack and a geographical location of that ATM 130. Each training record is further labeled with a flag that indicates a brute force attack occurred for this set of input data. The input data and the expected output (an indication that the ATM 130 was subject to a brute force attack) is passed to the MLM 115.

The MLM 115 configures its weighing factors on the input data necessary to correctly output that the ATM 130 was subject to a brute force attack and derives a machine-learning algorithm that when provided the input data without the labeled indication for the brute force attack, provides as output a predicted brute force attack on the ATM 130.

Feature/Factor manager 113 continues training the MLM 115 on a set of training records over a given past historical period of time and then tests the MLM 115 for accuracy on some training records not used during the training session.

Once the accuracy is sufficient, the MLM 115 is released for use in predicting brute force ATM attacks when provided a new set of input data (visual features/factors and other data discussed above with the training records).

MLM 115 is now ready to provide predicted brute force attacks on specific ATMs 130 in specific geographic locations. Cameras 120 and/or 137 stream video of an area that surrounds and is adjacent to the ATM 130. When the video identifies a person, vehicle, and any objects (chains, hooks, ropes, explosive devices, guns, etc.) present at the ATM, the video is passed to feature/factor manager 113. Feature/Factor manager 113 returns features/factors such a vehicle type, vehicle make, vehicle size, vehicle orientation relative to the ATM 130 (for example the front of the vehicle is facing away from the front of the ATM 130, the front of the vehicle is pulled past an outer side of the ATM 130, the vehicle is aligned directly in front of the ATM 130, etc.), a calculated distance between the vehicle and the ATM 130, a total number of individuals present in the vehicle, attributes of each individual and attributes of clothing, jewelry, tattoos, etc.; and any known objects present in the video such as chains, hooks, ropes, explosive devices, guns, etc. Feature/Factor manager 113 returns the visual features/factors back to physical force detection manager 114 is real time as the video is continuing to be streamed from the cameras 120 and/or 137.

Physical force detection manager 114 passes the features/factors as input to the MLM 115 along with a location identifier (such as zip code), time of day, day of week, calendar date, current weather at the location (obtained from a web-based weather service), and ATM identifier for the ATM 130. MLM 115 returns as output a predicted confidence value 0-100% that the given individuals and vehicle presently in front of or at the ATM 130 are potentially going to attempt a brute force attack on the ATM 130.

Physical force detection manager 115 receives the confidence value and compares it against one or more thresholds or a threshold range to determine what next processing actions if any to perform. For example, if the confidence value when compared to a first threshold is above that threshold but below another threshold (or the confidence value is within a threshold range), physical force detection manager 115 may not raise any alert yet but may begin to performing more fine grain visual feature analysis from the real-time video, such as obtain a license plate from an image frame of the video, process an Application Programming Interface (API) to interact with a local department of motor vehicles system 143 and obtain a traffic incident records for the vehicle and if permitted, a registered individual that has the vehicle registered. Physical force detection manager 114 may then uses the information about the registered individual to check with a local law enforcement system 143 for arrests and/or pending charges of the individual. The information returned may not precipitate any additional action by manager 114 but may cause the manager 114 to elevate the confidence score to a higher score, which now exceeds that threshold for sending an alert. In such a case, manager 114 uses another API to message a law enforcement service/system 143 that a potential hook and chain event is in progress at ATM 130 located at address X and/or a FI system 143 associated with the ATM 130 may also be messaged.

So, even when the confidence value returned by MLM 115 is not high enough (not elevated enough), manager 114 may perform additional actions and modify the confidence value such that it becomes elevated and necessitates the manager 114 sending an alert or notification message to a law enforcement service/system and a FI service/system 143.

Additionally, when the confidence value (as returned by MLM 115 or as adjusted by manager 114) is above a predefined threshold, Manager 114 sends the alerts to systems 143 and begins to actively gather a variety of information about the event for the vehicle, the individual(s), the ATM 130, video clip from the video, etc. This information is packaged into an incident report, which can be logged and/or sent to systems 143.

In an embodiment, the features/factors supplied as input may also comprise additional feature/factors gathered by manager 114 after the visual feature/factors are provided by feature/factor manager 113. For example, manager 113 uses an API to identify a total number of hook and chain incidents within a zip code/city associated with the ATM 130 within a predefined period of time using an external crime reporting system 143. This total number of local hook and chain incidents may an additional feature/factor used to train MLM 115 and obtain and provided by manager 114 for real time events being evaluated for the ATM 130. Each previous hook and chain incidents may also have a severity level assigned to it in a corresponding FI system, which manager 114 can cross reference and obtain the severity levels for each incident and use the severity level as still another feature/factor used to train MLM 115.

When physical force detection manager 114 determines that an alert is needed for a current event ongoing at the ATM 130, manager 114 may perform a customized workflow of actions. A first portion of the workflow may instruct manager 114 to notify a security system 143, the FI system 143 associated with the ATM 130, and local law enforcement system 143. A second portion of the workflow may instruct manager 114 to instruct ATM app 135 and/or security agent 136 to shut down the ATM 130, activate dye packs in currency bins of the ATM 130, locking any gates that the ATM 130 has access to, sounding an alarm, etc. A third portion of the workflow may instruct manager 114 to compare photos captured of the individual and the vehicle within image frames provided in the video by cameras 120 and 137 to compare against photos associated with past incidents of hook and chain events in the local area (by obtaining incident records from a local crime reporting system 143 or from the security system 143 of a FI). Photos that substantially match based on a scoring system of similar objects and attributes are retained within a packet of information for the current event at the ATM 130. A fourth portion of the workflow may instruct manager 114 to activate previously inactivated cameras 120 and/or 137 and start actively looking for fine-grain visual characteristics for the vehicle (such as license plate number), facial attributes, or any distinctive attributes of the individual (including clothing, walk or gait, deformities, tattoos, etc.). A fifth portion of the workflow may instruct manage to assemble a detailed (fine-grain) packet of information for the current hook and chain event at the ATM 130 comprising the visual features, the details visual features, a video clip of the event, license plate number, registration information and records, crime records, potential related incidents to other hook and chain events based on photo comparison, etc. The packet of information is retained and linked to the hook and chain event and may be transmitted to any external system 143 within an alert or notification of after an alert or notification is sent to the external system 143.

It is noted that the workflow processed by manager 114 is configurable such that all the workflow steps can be processed, just one workflow step can be processed, or any combination of workflow steps can be processed.

Moreover, the workflow is configurable by any given FI to include additional steps, modified steps, or removed steps from that which was described above.

In an embodiment, either cameras 120 and/or 137 or one of the peripheral modules 132 comprises a microphone. The microphone captured audible data spoken by the individual during an event and captures sounds such as chains hitting the ground or the pavement. Physical force detection manager 114 may be configured to use audio to text translation or use a third-party service for the audio to translation. Keywords or preconfigured sounds (such as chains) can be identified and used as feature/factors in training the MLM 114 and for any current event being evaluated.

Additionally, an audio clip can be retained in the packet of information for the hook and chain event. In some cases, physical detection manager 114 utilizes a text to speech translator to actively communicate and warn any individual about to engage in a hook and chain event at the ATM 130 by playing a warning message over a speaker of the ATM 130 informing the individual that authorities have been dispatched or are about to be dispatched and that the individual identity is known or will be known from the video captured.

In an embodiment, voice analysis on speech captured of the individual may be performed and recorded as a unique voice print in the packet of information.

In an embodiment, manager 114 can attempt to match the voice print to a previously recorded voice print available through a crime system 143 and/or security system 143 of a given FI. Any match to the individual causes manager 114 to note the match and the identity of the individual within the packet of information retained for the event.

System 100 utilizes computer vision and machine-learning to predict brute force attacks on ATMs 130 in the manners discussed above and below. Fine-grain visual features and a variety of external system 143 information is obtained in a packet of information for any brute force attack. System 100 can elevate a current event to an alert situation and enhance information gathering based thereon. This provides an adapted, customized, learning, and preventative security to ATMs 130 subject to brute force attacks.

In an embodiment, system 100 operates on any transaction terminal that comprises a card reader with card slot 132, such as Self-Service Terminals (SSTs) operated for self-checkouts and/or Point-Of-Sale (POS) terminals operated by cashiers of a retailer during customer-assisted checkouts. Thus, system 100 can comprises a plurality of different types of transaction terminals beyond just the ATM 130 illustrated in FIG. 1 of system 100.

In an embodiment, feature/factor manager 113, physical force detection manager 113, and MLM 115 is processed on a local server 110 associated with ATM 130.

In an embodiment, feature/factor manager 113, physical force detection manager 113, and MLM 115 is processed on a cloud 110.

In an embodiment, only a single camera 120 or 137 is deployed with the system 100. In an embodiment, the single camera is overhead camera 120. In an embodiment, the single camera is integrated or affixed camera 137.

In an embodiment, more than one camera 120 or 137 is deployed with system 100. In an embodiment each of the more than one cameras are overhead cameras 120. In an embodiment each of the one or more cameras are integrated or affixed cameras 137. In an embodiment, at least one of the one or more cameras is an overhead camera 120 and at least one other of the one or more cameras is an integrated or affixed camera 137.

In an embodiment, wireless transceivers (types of peripheral modules 132) may be activated to scan for wireless devices in possession of the individual at the ATM 130. The transceivers can scan for wireless device identifiers that are within range of the transceivers, and the device identifiers may be recorded in the packet of information for purposes of linking a device of the individual to other past brute force attacks or for purposes of allowing law enforcement to track the location of the mobile device in possession of the individual.

These embodiments and other embodiments are now discussed with reference to the FIGS. 2-3.

FIG. 2 is a diagram of a method 200 for monitoring and predicting physical force attacks on transaction terminals, according to an example embodiment. The software module(s) that implements the method 200 is referred to as a "terminal brute force attack predictor." The terminal brute force attack predictor is implemented as executable instructions programmed and residing within memory and/or a non-transitory computer-readable (processor-readable) storage medium and executed by one or more processors of a device. The processor(s) of the device that executes the terminal brute force attack predictor are specifically configured and programmed to process the terminal brute force attack predictor. The terminal brute force attack predictor has access to one or more network connections during its processing. The network connections can be wired, wireless, or a combination of wired and wireless.

In an embodiment, the terminal brute force attack predictor executes on cloud 110. In an embodiment, the terminal brute force attack predictor executes on server 110.

In an embodiment, the terminal brute force attack predictor executes on ATM 130.

In an embodiment, a portion of the terminal brute force attack predictor executes on cloud/server 110 and another portion of the terminal brute force attack predictor executes on ATM 130.

In an embodiment, the terminal brute force attack predictor is one, all, or any combination of or both of 113, 114, 115, and/or 136.

At 210, the terminal brute force attack predictor extracts visual features from a video. The video features are associated with one or more of a vehicle, an orientation of the vehicle relative to a transaction terminal 130, an individual at the transaction terminal 130 in a given location, a predefined object associated with a chain, a hook, a rope, a weapon, etc. It is to be noted that the terminal brute force attack predictor is continually evaluating the video, such that an individual that parks a vehicle out of the line of sight of one of the cameras 120 and/or 137 will still be monitored closely such that when the vehicle comes into the line of sight the vehicle features and orientation relative to terminal 130 is extracted from the video and accounted for in the threat level associated with the individual. The same may be true with the tools, such as a chain, a hook, a rope, or even a weapon (such as an explosive device or a gun).

In an embodiment, at 211, the terminal brute force attack predictor identifies the visual features as a size of the vehicle, a color of the vehicle, a make of the vehicle, a model of the vehicle, a position and a direction of the vehicle relative to the transaction terminal 130, and a calculated distance between the vehicle and the transaction terminal 130.

In an embodiment of 211 and at 212, the terminal brute force attack predictor identifies individual visual features as a height of the individual, a hair color of the individual, a complexion of the individual, clothing worn by the individual, jewelry worn by the individual, facial features of the individual, tattoos of the individual, and any object being held or in proximity to the individual (such as a weapon (explosive device, gun, etc.), a tool, a rope, a hook, a chain, etc.).

At 220, the terminal brute force attack predictor obtains factors associated with past brute force attacks on terminals 130 in an area associated with the given location (such as zip code, city, etc.) for a given period of time.

In an embodiment of 212 and 220, at 221, the terminal brute force attack predictor interacts with an external crime reporting system 143 and obtains some of the factors as a total number of the past brute force attacks in the area and a severity level associated with each past brute force attack.

In an embodiment of 221 and at 222, the terminal brute force attack predictor adds a current time of day, a current day of week, current weather being experienced at the given location, and a current calendar date to the factors.

At 230, the terminal brute force attack predictor provides the visual features and the factors as input to a MLM 115.

At 240, the terminal brute force attack predictor receives a confidence value as output from the MLM 115 indicating a percentage potential that the individual is likely to engage in a brute force attack on the transaction terminal 130.

In an embodiment, at 241, the terminal brute force attack predictor modifies the confidence value by increasing the percentage based on fine-grain information obtained on the vehicle and the individual from one or more external systems 143 (such as license number and registration records and crime arrests or conviction for the individual).

At 250, the terminal brute force attack predictor provides an alert when the confidence value exceeds a threshold value.

In an embodiment, at 251, the terminal brute force attack predictor processes a workflow comprising a plurality of actions based on the confidence value.

In an embodiment, at 260, the terminal brute force attack predictor activates dye packs within media cassettes of the transaction terminal 130 to render currency in the media cassettes unusable in a safe of the transaction terminal 130.

In an embodiment, at 270, the terminal brute force attack predictor shuts down operation of the transaction terminal 130.

In an embodiment, at 280, the terminal brute force attack predictor activates a microphone and a camera that was not associated with the video to capture fine-grain visual features of the individual and audio associated with speech and activities of the individual at the transaction terminal 130.

In an embodiment of 280 and at 281, the terminal brute force attack predictor assembles and logs a packet of information comprising a video clip for the video, the visual features, the factors, the confidence value, the fine-grain visual features, and the audio.

In an embodiment of 281 and at 282, the terminal brute force attack predictor adds a department of motor vehicle information for the vehicle through interaction a vehicle registration system 143 to the packet of information and the terminal brute force attack predictor adds crime information for the individual through interaction with a crime reporting system 142 to the packet of information.

FIG. 3 is a diagram of another method 300 for monitoring and predicting physical force attacks on transaction terminals, according to an example embodiment. The software module(s) that implements the method 200 is referred to as a "terminal brute-force attack monitor" The terminal brute-force attack monitor is implemented as executable instructions programmed and residing within memory and/or a non-transitory computer-readable (processor-readable) storage medium and executed by one or more processors of a device. The processor(s) of the device that executes the terminal brute-force attack monitor are specifically configured and programmed to process the terminal brute-force attack monitor. The terminal brute-force attack monitor has access to one or more network connections during its processing. The network connections can be wired, wireless, or a combination of wired and wireless.

In an embodiment, the device that executes the terminal brute-force attack monitor is cloud 110. In an embodiment, the device that executes the terminal brute-force attack monitor is server 110.

In an embodiment, the device that executes the terminal brute-force attack monitor is ATM 130.

In an embodiment a portion of the terminal brute-force attack monitor executes on cloud/server 110 and another portion of the terminal brute-force attack monitor executes on ATM 130.

In an embodiment, the terminal brute-force attack monitor is one of, some combination of, or all of 113, 114, 115, 136, and/or method 200.

The terminal brute-force attack monitor presents another and, in some ways, enhanced processing perspective from that which was discussed above with method 200 of FIG. 2.

At 310, the terminal brute-force attack monitor obtains past incident records for past brute force attacks on transaction terminals 130 within an area during a given period of time.

At 320, the terminal brute-force attack monitor obtains past video for each of the past incident records.

At 330, the terminal brute-force attack monitor extracts training visual features from the past video for each past incident record. The training visual features associated with individuals of past brute force attacks, vehicles of the past brute force attacks, orientations of the vehicles relative to corresponding transaction terminals 130 of the past brute force attacks, and objects (explosive device, gun, weapon, hook, rope, chain, tools) held of in proximity to the individuals during the past brute force attacks.

At 340, the terminal brute-force attack monitor identifies training factors as a total number of the past brute force attacks within a given period of time, a severity of each past brute force attack, a time of day of each past brute force attack, a calendar day for each past brute force attack, a day of week for each past brute force attack, and weather known to be experienced in the area for each past brute force attack.

At 350, the terminal brute-force attack monitor generates training records for training a MLM 115 using the incident records and using non-incident records for where there was no past brute force attach. Each training record that is associated with a corresponding incident record is labeled with an expected output that a given past brute force attack occurred, and each transaction record corresponding to a non-incident record labeled with the expected output that no brute force attack occurred.

At 360, the terminal brute-force attack monitor trains the MLM 115 with the corresponding training visual features and the corresponding training factors as input for a given training record and a corresponding confidence value produced as output by the MLM 115 as a percentage potential that the given training record is or is not associated with one of the past brute force attacks.

In an embodiment, at 370, the terminal brute-force attack monitor receives real-time video for a particular transaction terminal 130. The terminal brute-force attack monitor extracts current visual features for a current vehicle and at least one current individual identified with the current vehicle. The terminal brute-force attack monitor obtains current factors for the area within a current period of time and the terminal brute-force attack monitor provides the current visual features and the current factors to the MLM 115 as input. The terminal brute-force attack monitor receives as output from the MLM 115 a current corresponding confidence value.

In an embodiment of 370 and at 371, the terminal brute-force attack monitor adjusts the current corresponding confidence value based on additional information obtained for the current individual and the current vehicle from one or more external systems 143.

In an embodiment of 371 and at 372, the terminal brute-force attack monitor processes a workflow of actions based on the corresponding confidence value when compared to one or more threshold confidence values or when compared to a range of threshold values.

In an embodiment of 371 and at 373, the terminal brute-force attack monitor determines after 371 that the corresponding confidence value exceeds a threshold value and sends a real-time alert to a law enforcement system 143, a security system 143, and a FI system 143.

In an embodiment of 373 and at 374, the terminal brute-force attack monitor activates a dye pack in a media cassette of the particular transaction terminal 130 and activates a particular camera 120 and/or 137 associated with the particular transaction terminal 130. Furthermore, terminal brute-force attack monitor activates a microphone for the particular camera 120 and/or 137 and/or the particular transaction terminal 130. The terminal brute-force attack monitor assembles and retains a packet of information comprising, audio captured by the microphone, additional fine-grain visual features captured by the particular camera 120 and/or 137, the current visual features, the current factors, the corresponding confidence value, and a video clip of video representing the scene at the particular transaction terminal 130. The packet of information may also include additional information obtained at 371.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

deriving factors associated with past brute force attacks on terminals within a given area over a given period of time, wherein the factors comprise a total number of the past brute force attacks, a severity of each past brute force attack, a time of day of each past brute force attack, a calendar date for each past brute force attack, a day of week for each past brute force attack, and weather experienced in the given area for each past brute force attack;

extracting visual features from past video captured of the past brute force attacks, wherein the visual features are associated with individuals of the past brute force attacks, vehicles of the past brute force attacks, orientations of the vehicles relative to corresponding terminals of the past brute force attacks, and objects held by or in proximity to the individuals during the past brute force attacks;

training a machine learning model (model) to predict in real time a future brute force attack when provided the factors and the visual features as input;

providing current factors and current visual factors as input for a given terminal located within the given area; and sending a real-time alert when a confidence value returned by the model as output indicates an in-progress brute force attack at the given terminal.

2. The method of claim 1, wherein deriving further includes obtaining past incident records for the terminals within the given area.

3. The method of claim 2, wherein deriving further includes obtaining the past video based on past incident reports.

4. The method of claim 1, wherein deriving further includes identifying the visual features as features associated with individuals and vehicles involved in the past brute force attacks.

5. The method of claim 1, wherein sending further includes adjusting the confidence value based on additional information obtained from at least one external system.

6. The method of claim 1, wherein sending further includes processing a workflow of actions based on a comparison of the confidence value to a threshold or a range of thresholds.

7. A system, comprising:

a processor;

a memory coupled to the processor; and the processor configured to perform operations comprising:

deriving factors associated with past brute force attacks on terminals within a given area over a given period of time, wherein the factors comprise a total number of the past brute force attacks, a severity of each past brute force attack, a time of day of each past brute force attack, a calendar date for each past brute force attack, a day of week for each past brute force attack, and weather experienced in the given area for each past brute force attack;

extracting visual features from past video captured of the past brute force attacks, wherein the visual features are associated with individuals of the past brute force attacks, vehicles of the past brute force attacks, orientations of the vehicles relative to corresponding terminals of the past brute force attacks, and objects held by or in proximity to the individuals during the past brute force attacks;

training a machine learning model (model) to predict in real time a future brute force attack when provided the factors and the visual features as input;

providing current factors and current visual features as input for a given terminal located within the given area; and sending a real-time alert when a confidence value returned by the model as output indicates an in-progress brute force attack at the given terminal.

8. The system of claim 7, wherein the terminals are one or more of automated teller machines, self-service terminals, or point-of-sale terminals.

9. The system of claim 7, wherein deriving further includes obtaining past incident records for the terminals within the given area from an external crime reporting system and obtaining a severity level associated with each past brute force attack.

10. The system of claim 7, wherein deriving further includes identifying the visual features as a size of a vehicle, a color of the vehicle, a make of the vehicle, a model of the vehicle, a position and direction of the vehicle relative to the given terminal, and a calculated distance between the vehicle and the given terminal.

11. The system of claim 7, wherein sending further includes modifying the confidence value based on information obtained from a vehicle registration system and a crime reporting system for a vehicle and any individuals detected at the given terminal.

12. The system of claim 7, wherein sending further includes assembling and logging a packet of information comprising a video clip, the factors, the confidence value, and audio captured from a microphone at the given terminal.

13. A method, comprising:

obtaining factors associated with past physical attacks on terminals within a given area over a given period of time, wherein the factors comprise a total number of the past physical attacks, a severity of each past physical attack, a time of day of each past physical attack, a calendar date for each past physical attack, a day of week for each past physical attack, and weather experienced in the given area for each past physical attack;

extracting visual features from video captured of the past physical attacks, wherein the visual features are associated with individuals of the past physical attacks, vehicles of the past physical attacks, orientations of the vehicles relative to corresponding terminals of the past physical attacks, and objects held by or in proximity to the individuals during the past physical attacks;

training a machine learning model to predict a future physical attack when provided the factors and the visual features as input;

extracting current visual features from current video for a given terminal located within the given area; and sending a real-time alert when a confidence value returned by the machine learning model indicates a potential physical attack at the given terminal.

14. The method of claim 13, wherein obtaining further includes acquiring the factors as a total number of the past physical attacks and severity levels assigned to each past physical attack from an external crime reporting system.

15. The method of claim 13, wherein extracting the visual features further includes identifying a vehicle in the video captured of the past physical attacks and identifying identifying vehicle attributes comprising vehicle size, vehicle color, vehicle make, vehicle model, and vehicle position relative to corresponding terminals involved in the past physical attacks.

16. The method of claim 13, wherein extracting further includes identifying individual attributes comprising height, complexion, clothing, and any objects being held or in proximity to individuals involved in the past physical attacks.

17. The method of claim 13, wherein training further includes generating training records comprising the factors and the visual features as input and labeling training records with expected outputs indicating that corresponding past physical attacks occurred.

18. The method of claim 13, wherein extracting the current visual features further includes identifying a current vehicle and at least one current individual in the current video and capturing current visual features comprising current vehicle attributes and current individual attributes from the current video.

19. The method of claim 13, wherein sending further includes assembling a packet of information comprising video clips, the visual features, the factors, and the confidence value.

20. The method of claim 13, wherein sending further includes activating dye packs within media cassettes of the given terminal when the confidence value exceeds a threshold value.

* * * * *